Patented Oct. 12, 1954

2,691,443

UNITED STATES PATENT OFFICE 2,691,443

MAGNETIC PERICLASE PREPARATION AND SEPARATION

Robert A. Schoenlaub, Cleveland, Ohio, assignor to Sylvester Processes, Inc., Solon, Ohio, a corporation of Ohio No Drawing. Application October 12, 1949, Serial No. 121,055

3 Claims. (Cl. 209—8)

Periclase has the property of taking up ferrous and ferric oxide in solid solution. It can hold as much as about 50 per cent of its own weight in iron oxide. Most commonly, the iron oxide is in the ferric form or at least predominantly so. Crystals of periclase containing 3 to 10 per cent of iron oxide are brownish in color. High iron content deepens the color until it is almost black. Under the microscope, periclase crystals with low iron content are transparent yellow or amber, and as the iron oxide content increases, the color becomes darker, finally almost black and opaque. As occurring in ordinary refractory manufacture, to the extent that iron oxide may be present, it is in small percentage, and the periclase is usually transparent and light in color, and such periclase is only feebly magnetic. There is a relationship between the state of oxidation, as well as amount of iron, and the extent of magnetic property in periclase, but the relationship is not simple.

In close microscopic examination, I have found that opacity and deepened color in periclase formed with an iron oxide take-up is the result of multitudinous inclusions, which may be from ½ micron to colloidal, in size. It is probable that these inclusions are an "exsolution" phase or phases, as it is termed by mineralogical chemists. That is, iron oxide taken up in solution at the high temperature, is in part separated out of solution in the host crystal by suitable cooling. Such a phase is soluble in the host crystal at high temperatures and is less soluble at low temperatures. Thus, in cooling, iron oxide precipitates out from solution in the periclase crystal, and forms fine inclusions in such host crystal. The exsolution phase may include also magnesio-ferrite, $MgO.Fe_2O_3$, and in some cases magnesio-manganate, $MgO.Mn_2O_3$, magnesio-chromate, $MgO.Cr_2O_3$, etc. The magnetic properties of periclase containing iron oxide depend upon the amount and kind of the exsolution phase. The chemical stability is also affected. Normally, the chemical stability is increased. Pure periclase is not hydration-resistant nor resistant to weathering. But a suitably prepared iron oxide exsolution-bearing periclase is resistant and also magnetic.

I have found that with an amount of iron oxide less than 5 per cent (the equivalent of 6.3 per cent of $MgO.Fe_2O_3$), the periclase is on the transparent order and non-magnetic. If it contains more than 5 per cent $Fe_2O_3$, it may or may not have exsolution structures and magnetism, depending upon its manner of preparation. An amount of 5 per cent $Fe_2O_3$ seems to be the saturation point of iron oxide in periclase.

I have found that the exsolution structures in periclase containing more than 5 per cent $Fe_2O_3$ are determined by the heat treatment during cooling. If the cooling is fairly rapid, the periclase is transparent and relatively non-magnetic. However, by cooling the periclase especially slowly, and particularly in the temperature range 1700° to 1600° F., there is developed a maximum magnetic property and opacity. The cooling through the afore-mentioned temperature range should be at least through a period of ½ hour and preferably one hour or more. Thus, in cooling down from the furnacing temperature, a period of several hours is desirable, and especially particular care must be taken for an adequately slow rate between about 1800° F. to 1500° F. Above this range or below it, the rate of cooling has little effect. This applies to periclase containing 5–10 per cent of $Fe_2O_3$. If the iron oxide content is higher, the magnetic property develops more quickly and at somewhat higher temperatures.

While this magnetic property in periclase may be directed to other results, it is of particular importance to facilitate the extraction of the periclase from magnesian materials, such as for instance dolomite and serpentine. By operating so as to develop a highly magnetic property in the periclase, the extraction of magnesia can be effected readily by simple magnetic machines. Otherwise, its extraction is difficult.

The magnetic separability of minerals is the total effect of a number of independent properties, such as size of grain, magnetic susceptibility, permeability, etc. These properties are difficult to measure and to evaluate. With a ferro-magnetic substance such as periclase, it is comparatively easy to measure the relative magnetic remanence. This is the remanent or permanent magnetism imparted by a magnetic field. If we confine our observations to soft magnetic materials of a more or less similar nature, it is a reasonable assumption that remanence is closely related to magnetic extractability.

Based upon this assumption, experiments were performed upon small bars of identical size and shape, which were magnetized in the same magnetic field in the same way. Their degree of magnetism or remanence was then measured. The bars and their relative remanence were as follows:

| | Relative remanence |
|---|---|
| Magnetite—diverse sources and kinds | 90–150 |
| Magnesio-ferrite ($MgO.Fe_2O_3$) $Fe_2O_3$ 80% | 100 |
| Steel mild—hot rolled | 52 |
| Periclase, $Fe_2O_3$—8.34%, cooled 1800° F.–1500° F. 4 hours | 2.96 |
| Periclase, $Fe_2O_3$—8.34%, air cooled from 2600° F | .114 |
| Periclase, $Fe_2O_3$—.43%, cooled 1800° F.–1400° F. 4 hours | 0.0 |

This shows the remanence of periclase which was slowly cooled to be 26 times greater than that of air cooled periclase of similar composition, but only 1/35 as great as that of magnesio-ferrite.

The magnetism of periclase can be varied somewhat by its content of other substances. Alumina is not very soluble, only to the extent of about 1/2 per cent in periclase. Chromium oxide and manganese oxide are soluble to a greater extent. In tests with periclase made up to contain iron oxide, and iron oxide with chromium oxide and iron oxide with manganese oxide, the relative magnetic remanence of the products was as follows:

| | Relative remanence |
|---|---|
| Magnesio-ferrite ($MgO.Fe_2O_3$) 80% $Fe_2O_3$ | 100 |
| Periclase, 8.34% $Fe_2O_3$, annealed | 4.7 |
| Periclase, 8.34% $Fe_2O_3$, 1% $Cr_2O_3$, annealed | 1.5 |
| Periclase, 8.34% $Fe_2O_3$, 1% $Mn_2O_3$, annealed | 4.5 |

Chromium oxide then has an adverse effect upon magnetism, and $Mn_2O_3$ has no significant effect.

Experience has shown that periclase with a remanence of about 0.7 on the above scale is separable. Periclase containing more than 5 per cent iron oxide is separable if suitably developed in exsolution state in accordance with the present invention, if a desirably high magnetic property can be provided. As the iron oxide content is increased beyond about 5 per cent, the periclase becomes increasingly magnetic. The amount of iron oxide, and particularly the technique employed to develop a suitable exsolution form is important.

For the practice of the invention, a desired source of magnesian material may be employed, for instance dolomite, and there may be compounded serpentine, olivene, etc. The iron oxide content is adjusted to at least 5 per cent, and iron oxide as such may be added if necessary, for such purpose. The finely divided mixture is desirably briquetted, and is fired to a periclase-producing temperature, for instance 2800–3200° F. until the periclase crystals develop in considerable size, for instance 10 microns and larger, this requiring usually 1 to 4 hours. The particular feature of treatment then is the developing of the exsolution from the iron oxide in the periclase crystals, and thus the product is cooled slowly from 2000° to 1500° F., and particularly through the range 1700° to 1600° F. for a period of at least 1/2 hour and preferably one hour or more is involved. The cooling operation can be effected in any conventional cooler, providing that proper precautions are taken to attain the necessary retention time and temperature. A shaft cooler is advantageous. Finally, the product is comminuted, and the magnetic periclase is separated from the gangue on a wet magnetic drum, or magnetic deironer or similar device for picking out fine magnetic materials.

The peculiar slow cooling in the present process is particularly contrary to practice dealing with magnesia heretofore. Customarily, products from the magnesia-preparing operation are cooled as rapidly as possible in the minimum size of equipment. This is a matter of but a few minutes over the critical range of temperature as regards the present invention. Furthermore, by the present invention a larger amount of iron may be incorporated in the periclase than is customary in the magnesia industry.

While this invention is especially advantageous for the extraction of magnesia from dolomite, it may, under certain conditions, be utilized with magnesites or other magnesian materials. For example, in the processing of a natural magnesite which contains enough iron to give more than 5% $Fe_2O_3$ in the periclase, but which otherwise is contaminated with dolomite or serpentine gangue, the magnetic operation embodying the principles of this invention is advantageous.

As an example of the invention: A batch comprising 275.8 parts of −50 mesh dolomite and 100 parts of −50 mesh olivene was briquetted and fired above 3000° F. until the crystals of periclase averaged about 30 microns in size. The analysis of the dolomite and olivene was as follows:

| | Olivene | Dolomite |
|---|---|---|
| Ignition Loss | 4.08 | 47.39 |
| $SiO_2$ | 41.27 | .41 |
| $Fe_2O_3$ | 8.15 | .21 |
| $Al_2O_3$ | .34 | .11 |
| CaO | .40 | 30.11 |
| MgO | 46.76 | 21.77 |

The fired clinker was allowed to cool for three hours between 1800° F. and 1500° F. The clinker then dusted spontaneously and was further ground to 3% plus 200 mesh. It was then slurried in water, agitated vigorously for 20 minutes, and run through a magnetic deironer to produce a rough concentrate and a tailing. The rough concentrate was washed through the deironer several times to eliminate entrapped silicate and to produce a concentrate and middling suitable for further grinding and recirculation. The analysis of heads and products was as follows:

| | Heads | Tailings | Middlings | Concentrates |
|---|---|---|---|---|
| Ignition Loss | .17 | 5.58 | 24.25 | .64 |
| $SiO_2$ | 18.24 | 24.28 | 6.52 | .72 |
| $Fe_2O_3$ | 3.44 | .28 | 2.58 | 6.95 |
| $Al_2O_3$ | .84 | 1.20 | .94 | .45 |
| CaO | 36.05 | 61.60 | 40.0 | 2.71 |
| MgO | 41.60 | 1.40 | 25.7 | 88.48 |
| Percent Recovered | ---------- | 52.92 | 4.78 | 43.3 |

Other modes of applying the principle of the invention may be employed, change being made as regards the details described, provided the features stated in any of the following claims or the equivalent of such be employed.

I therefore particularly point out and distinctly claim as my invention:

1. In a process of producing magnesia, forming crystalline periclase of magnetic character by firing magnesian material with at least five percent of iron oxide at a temperature of from about 2800° F. to about 3200° F. for a length of time sufficient to form periclase crystals of at least 10 microns and then slowly cooling, including cooling between 1700° and 1600° F. over a period of at least one-half hour, comminuting the mass and finally magnetically separating the periclase from non-magnetic residue.

2. In a process of producing magnesia, forming crystalline periclase by firing magnesian material with at least five percent of iron oxide at a temperature of from about 2800° F. to about 3200° F. for a length of time sufficient to form periclase crystals of at least 10 microns and developing magnetic character in the periclase by cooling slowly by a period of several hours through the temperature range between 2000° and 1500° F., including at least one-half hour between 1700° and 1600° F., comminuting the mass and finally magnetically separating the periclase from non-magnetic residue.

3. In a process of producing magnesia, forming crystalline periclase of magnetic character by firing magnesian material with at least five percent of iron oxide at a temperature above 3000° F. and then slowly cooling, for a length of time sufficient to form periclase crystals of at least 10 microns, including at least one-half hour between 1700° and 1600° F., comminuting the mass and finally magnetically separating the periclase from the non-magnetic residue.

References Cited in the file of this patent

UNITED STATES PATENTS

| Number | Name | Date |
|---|---|---|
| 1,527,347 | Browne | Feb. 24, 1925 |
| 2,348,847 | Pike | May 16, 1944 |

FOREIGN PATENTS

| Number | Country | Date |
|---|---|---|
| 274,889 | Great Britain | Apr. 12, 1928 |
| 546,642 | Great Britain | July 23, 1942 |
| 583,009 | Great Britain | Dec. 4, 1946 |

OTHER REFERENCES

Ser. No. 280,215 (A. P. C.), published Apr. 27, 1943.